(12) United States Patent
Kara-Ivanov et al.

(10) Patent No.: US 9,722,774 B2
(45) Date of Patent: Aug. 1, 2017

(54) NON-LEAKY HELPER DATA: EXTRACTING UNIQUE CRYPTOGRAPHIC KEY FROM NOISY F-PUF FINGERPRINT

(71) Applicant: Samsung Electronics Co., Ltd., Suwon-si, Gyeonggi-do (KR)

(72) Inventors: Michael Kara-Ivanov, Ramat Gan (IL); Vadim Bugaenko, Ramat Gan (IL); Yaron Shany, Ramat Gan (IL); Jun Jin Kong, Yongin-si (KR); Shay Landis, Ramat Gan (IL); Shmuel Dashevsky, Ramat Gan (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 99 days.

(21) Appl. No.: 14/699,354

(22) Filed: Apr. 29, 2015

(65) Prior Publication Data

US 2016/0323096 A1    Nov. 3, 2016

(51) Int. Cl.
*H04L 9/00* (2006.01)
*H04L 9/08* (2006.01)
*G06F 21/44* (2013.01)
*G06F 21/73* (2013.01)

(52) U.S. Cl.
CPC .............. *H04L 9/002* (2013.01); *G06F 21/44* (2013.01); *G06F 21/73* (2013.01); *H04L 9/0861* (2013.01); *H04L 9/0866* (2013.01)

(58) Field of Classification Search
CPC ....... H04L 9/002; H04L 9/0861; G06F 21/44; G06F 21/75
USPC ......................................................... 713/189
See application file for complete search history.

(56) References Cited

U.S. PATENT DOCUMENTS

| | | | |
|---|---|---|---|
| 8,412,950 B2 | 4/2013 | Kevenaar et al. | |
| 8,433,983 B2 | 4/2013 | Tuyls et al. | |
| 8,525,169 B1 | 9/2013 | Edelstein et al. | |
| 2009/0282259 A1* | 11/2009 | Skoric | G06F 21/35 713/185 |
| 2010/0023800 A1* | 1/2010 | Harari | G06F 11/1068 714/2 |
| 2011/0007893 A1 | 1/2011 | Sunar et al. | |
| 2011/0215829 A1 | 9/2011 | Guajardo Merchan et al. | |
| 2012/0072737 A1* | 3/2012 | Schrijen | H04L 9/3278 713/189 |
| 2012/0131340 A1 | 5/2012 | Teuwen et al. | |
| 2012/0204023 A1 | 8/2012 | Kuipers et al. | |
| 2013/0010957 A1 | 1/2013 | Yu et al. | |
| 2013/0051552 A1 | 2/2013 | Handschuh et al. | |
| 2013/0142329 A1 | 6/2013 | Bell et al. | |

(Continued)

OTHER PUBLICATIONS

B. Škoric, "The Spammed Code Offset Method", IEEE Signal Processing Society, May 2014, 10 pages.

(Continued)

*Primary Examiner* — Kambiz Zand
*Assistant Examiner* — Tongoc Tran
(74) *Attorney, Agent, or Firm* — Harness, Dickey & Pierce P.L.C.

(57) ABSTRACT

A method generating a cryptographic key and corresponding helper data includes measuring an analog value associated with a physical property of cells of a memory array; digitizing the measured analog value to generate the cryptographic key; quantizing the measured analog value to generate the corresponding non-leaky helper data.

20 Claims, 8 Drawing Sheets

(56) References Cited

U.S. PATENT DOCUMENTS

| | | | |
|---|---|---|---|
| 2013/0194886 A1 | 8/2013 | Schrijen et al. | |
| 2013/0339733 A1* | 12/2013 | Nagai | H04L 9/3234 713/168 |
| 2014/0005967 A1 | 1/2014 | Fu et al. | |
| 2014/0089675 A1* | 3/2014 | Kato | H04L 9/0869 713/189 |
| 2014/0162464 A1* | 6/2014 | Dimitrakopoulos | H01L 23/5329 438/761 |
| 2014/0325237 A1* | 10/2014 | Van Der Leest | G06F 21/72 713/189 |
| 2015/0169247 A1* | 6/2015 | Wang | G11C 16/22 711/103 |
| 2015/0262675 A1* | 9/2015 | Lin | G11C 16/3459 365/185.12 |

OTHER PUBLICATIONS

Y. Dodis, "Fuzzy Extractors: How to Generate Strong Keys from Biometrics and Other Noisy Data", Jan. 20, 2008, 47 pages.

\* cited by examiner

FIG. 6

```
Generation Phase - Derive Key without corresponding Helper Data.

Key:01010110 10010000 00011000 01001000 01101010 00011010 10001000 00001101
```

F-PUF
```
Reproduction Phase without Helper Data.

Key:01010111 11010000 00011100 00001000 01101110 00001010 10001000 00001101

Analysis: Reproduced Key contains six mistakes
```

NON-LEAKY HELPER DATA: EXTRACTING UNIQUE CRYPTOGRAPHIC KEY FROM NOISY F-PUF FINGERPRINT

BACKGROUND

Electronic devices may be subject to counterfeiting by, for example, substituting an original component with a separately manufactured but subverted "look-alike" after the device has been certified by the manufacturer. If the counterfeit component remains undetected, a device having this counterfeit component contained therein is vulnerable. For example, the counterfeit component may perform the same functions as the intended component but may also contain additional functions that can be triggered by an adversary to compromise the security of the device or systems connected thereto.

A protection scheme may be utilized to detect these counterfeit components. Examples of protection schemes include using a key as a digital identifier to authenticate the source of the component. However, because such keys may be stored in memory, this digital identifier may be circumvented by reading the key from the memory, for example, with optical methods or the like.

In contrast, Physically Unclonable Function (PUF) technology, exploits manufacturing variations to derive a digital identifier. Because the digital identifier is hidden in the form of unique physical analog identifiers within the hardware, the digital identifier is not stored in binary form when the chip is powered down, and therefore, the key may not be stored in a memory that can be read. Further, because the PUF depends on random process variation, it is very difficult for a counterfeiter to create a counterfeit component having a same PUF as an original component. Therefore, it may be advantageous to use utilize a PUF as an identifier of a component.

However, when the key is initially generated from the PUF and when the PUF is regenerated again to determine the key for authentication, analog signals are generated based on physical proprieties of the device and subsequently digitized to generate the PUF. Noises in these analog measurements may make it difficult to determine the PUF, and, thus it may be difficult to authenticate the component. For example, if the analog measurement lies near a quantization boundary used to digitize the analog measurement, noise present during one of the generation and authentication phases of the PUF can flip the digitized value resulting in a key mismatch. Therefore, it may be desirable to utilize an error correction scheme with a PUF. However, conventionally, such error correction schemes may leak information about the PUF, which may compromise the integrity of the PUF.

SUMMARY

At least some example embodiments relate to a method of generating a cryptographic key and corresponding helper data.

In some example embodiments, the method includes measuring an analog value associated with a physical property of cells of a memory array; digitizing the measured analog value to generate the cryptographic key; quantizing the measured analog value to generate the corresponding helper data; and storing the helper data in a data register.

In some example embodiments, the helper data does not reveal information on the cryptographic key.

In some example embodiments, the measuring an analog value includes applying a plurality of voltage pulses to a cell of the plurality of cells of the memory array; and determining which one of the plurality of applied voltage pulses turns the cell on.

In some example embodiments, the applying a plurality of voltage pulses includes applying an incremental step pulse to the cell.

In some example embodiments, the memory array is a NAND flash memory array.

In some example embodiments, the physical property is respective threshold voltages of the cells of the memory array, and the method includes authenticating a device using the cryptographic key.

At least some example embodiments relate to a method of reproducing a cryptographic key.

In some example embodiments, the method may include measuring an analog value associated with a physical property of cells of a memory array; digitizing the measured analog value to generate an estimate of the cryptographic key; and correcting the estimate of the cryptographic key using helper data associated with the cryptographic key to reproduce the cryptographic key.

In some example embodiments, the helper data does not reveal information on the cryptographic key.

In some example embodiments, the correcting the estimate of the cryptographic key may include determining if values of bits of the cryptographic key are associated with an incorrect subset based on the helper data; and inverting the value of bits of the cryptographic key, if the determining determines that the values are associated with an incorrect subset to generate a refined estimate of the cryptographic key.

In some example embodiments, the method may include applying an error correction code to the refined estimate of the cryptographic key to reproduce the cryptographic key.

In some example embodiments, the physical property is respective threshold voltages of the cells of the memory array.

At least some example embodiments relate to a device configured to authenticate using a cryptographic key.

In some example embodiments, the device may include a memory array; and a controller configured to, measure an analog value associated with a physical property of cells of the memory array, digitize the measured analog value to generate the cryptographic key, quantize the measured analog value to generate the corresponding helper data, and store the helper data in a data register.

In some example embodiments, the device may include a pulse generator configured to apply a plurality of voltage pulses to a cell of the plurality of cells of the memory array. The controller may be configured to measure the analog value by determining which one of the plurality of applied voltage pulses turn the cell on.

In some example embodiments, the controller is further configured to remeasure an analog value associated with the physical property of the cells of the memory array, digitize the remeasured analog value to generate an estimate of the cryptographic key, and correct the estimate of the cryptographic key using the helper data associated with the cryptographic key to reproduce the cryptographic key.

In some example embodiments, the physical property is a threshold voltage of the cells of the memory array, and the controller is configured to authenticate the device using the cryptographic key.

In some example embodiments, the memory array is a NAND flash memory array.

In some example embodiments, the helper data does not reveal information on the cryptographic key.

In some example embodiments, the controller is configured to correct the estimate of the cryptographic key by, determining if values of bits of the cryptographic key are associated with an incorrect subset based on the helper data, and inverting the value of bits of the cryptographic key, if the controller determines that the values are associated with an incorrect subset to generate a refined estimate of the cryptographic key.

In some example embodiments, the controller is configured to reproduce the cryptographic key by applying an error correction code to the refined estimate of the cryptographic key.

BRIEF DESCRIPTION OF THE DRAWINGS

The patent and/or application file contains at least one drawing executed in color. Copies of this patent or patent application publication with color drawing(s) will be provided by the Office upon request and payment of the necessary fee.

Example embodiments will become more fully understood from the detailed description given herein below and the accompanying drawings, wherein like elements are represented by like reference numerals, which are given by way of illustration only and thus are not limiting of the embodiments.

FIG. 6 illustrates an example of generating and reproducing a cryptographic key from a flash based physical unclonable function F-PUF without utilizing non-leaky helper data according to some example embodiments;

Figure 1:
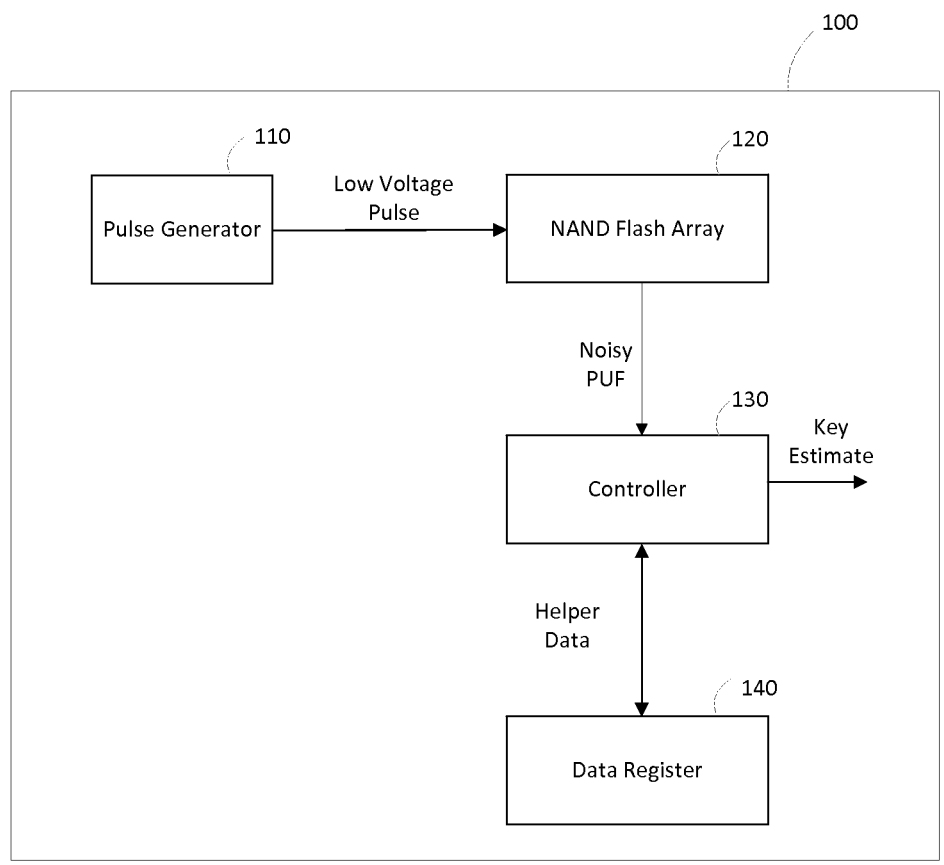
FIG. 1 illustrates a schematic block diagram of Flash-PUF (F-PUF) flash package according to some example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 illustrates F-PUF flash package according to some example embodiments.

Referring to FIG. 1, a F-PUF flash package 100 may include a programming device 110, a NAND flash array 120, a controller 130 and a data register 140. However, example embodiments are not limited thereto. For example, one or more of the programming device 110 and the data register 140 may be included in either the NAND flash array 120 and/or the controller 130.

The programming device 110 may be an incremental step pulse programming (ISPP) device. The ISPP device may perform partial or aborted programming of the NAND flash array 120 by applying a gradually increasing program voltage to a word line of the NAND flash array 120. The program voltage may gradually increase through a sequence of step increments until the program voltage reaches a level sufficient to properly program the target memory cell. In other example embodiments, rather than a sequence of step increments, only one or two pulses may be applied to reach a sufficient program voltage rather than gradually increasing the program voltage.

As discussed in more detail below, due to process variations, different cells in the NAND flash array 120 may require a different number of incremental step pulses to change their respective state and to reach a given voltage threshold. The programming device 110 may exploit these process variations by partially programming cells in a word line of the NAND flash array 120 to generate a unique fingerprint (e.g. a signature) based on the distribution of the different number of incremental step pulses to change a cell's respective state. This unique fingerprint may be used for identification and authentication. A fingerprint may be considered unique if fingerprints from different chips and/or different locations of the same chip differ significantly.

The NAND flash array 120 may include a row decoder and a column decoder (not shown).

The control circuit 130 generates various voltages necessary to perform the programming operation, the reading operation, and the erasing operation, and controls overall operations of the flash memory chip 100. For example, the controller 130 may generate control signals for controlling respective operations of the row decoder and the column decoder.

The row decoder may decode row control signals output by the controller 130, for example, row address signals, and may output a plurality of row selection signals according to a result of the decoding. The column decoder may decode a plurality of column control signals output by the controller 130 for example, column address signals, and may output a plurality of column selection signals according to a result of the decoding.

The NAND flash array 120 is an area in which data is written by applying a voltage to a transistor. The NAND flash array 120 may include memory cells consisting of floating-gate transistors formed on points where word lines WL0 through WLm-1 and bit lines BL0 through BLn-1 cross each other. Here, m and n are natural numbers.

In some example embodiments, the NAND flash array 120 may be a 3D vertical NAND (for example, a VNAND) in which vertical NAND strings are vertically oriented such that at least one memory cell is located over another memory cell. The at least one memory cell may comprise a charge trap layer.

The controller 130 may include a processor and a memory (not shown). The memory may contain computer readable code that, when executed by the processor, configures the controller 130 as a special purpose computer to perform the operations illustrated in one or more of FIGS. 3 and 5. For example, the memory may contain computer readable code that, when executed by the processor, configures the controller 130 to generate a cryptographic key and corresponding helper data such that the helper data is non-leaky, and to reproduce the generated cryptographic key using the non-leaky helper data.

Figure 2:
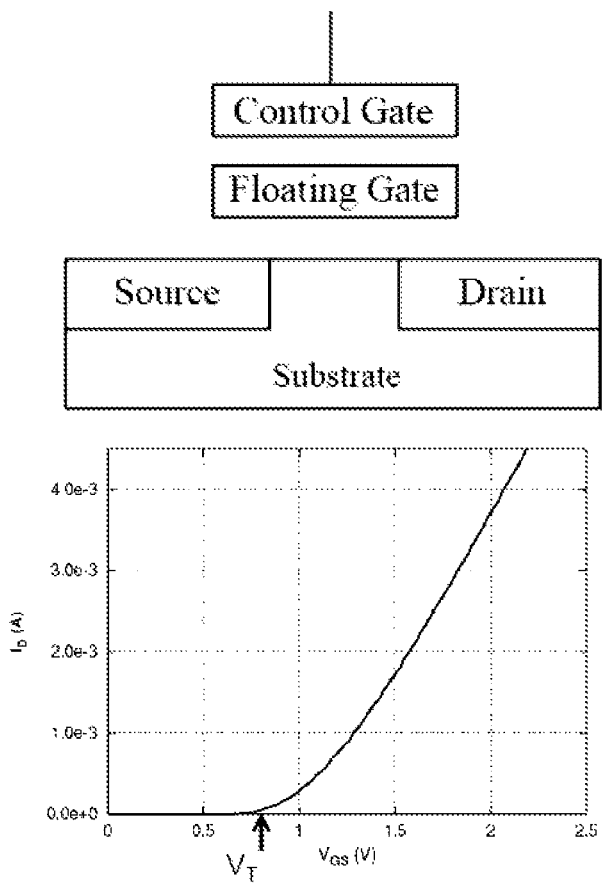
FIG. 2 illustrates a current response of a transistor to a gate source voltage applied thereto according to some example embodiments.

FIG. 2 illustrates a current response of a floating gate transistor to a gate source voltage applied thereto according to some example embodiments.

Referring to FIG. 2, a floating-gate transistor is a transistor with two gates between a source and a drain. The two gates include a control gate stacked on top of a floating gate that is electrically insulated due to an insulation conductor that is surrounded by oxide disposed between the control gate and a conductive channel.

The controller 130 may store data in the cells by selectively trapping negative charges on the floating gate. The trapped negative charge reduces the current flowing through the channel when the transistor is on. Thereafter, when reading data, the controller 130 may sense this current difference and translate the difference into an appropriate binary value.

In an n-type transistor, the conductive channel may not naturally exist between the source terminal and the drain terminal. Further, in a p-type transistor, the conductive channel may not naturally be wide enough for electrons to flow easily. Therefore, a gate-to-source voltage Vgs may be necessary to create the conductive channel between the source and the drain. The threshold voltage Vth of the floating-gate transistor is the minimum gate-to-source voltage differential needed to create a conductive channel sufficient to allow electrons to flow between the source and drain terminals of the floating-gate transistor.

The floating-gate transistors in the NAND flash array 120 may have slightly different variations due to uncontrollable factors in the manufacturing process. For example, variations in doping concentrations, the thickness of the floating gate oxide, and the control-gate coupling ratio can cause variations in the threshold voltage of each transistor.

These variations may result in slight differences in threshold voltages. As a result, the amount of stored charge in the floating gate for a cell to reliably represent a "0" state varies from cell to cell.

In some embodiments, a setup procedure including an initial erase of the NAND flash 120 with subsequent ISPP-like procedure, of a number/location of cells in the WL in the NAND flash array 120 may be referred to as a "challenge", and the threshold (which may be represented by a number of the pulses in the ISPP-like procedure) may be called a "response". In other embodiments, a setup procedure including an initial erase of the NAND flash with subsequent application of a single pulse to a number/location of the cells in the WL in the NAND flash array 120 may be referred to as a "challenge", and the state of a given cell (which may become programmed in response to the single pulse, or, alternatively, may stay unprogrammed), may be referred to as the "response". The unpredictable (but repeatable) differences in the transistor's threshold voltages may be exploited as a physical stimulus used to create a Physical Unclonable Function (PUF) having a unique challenge-response behavior.

A flash memory provides three major operations: a read operation, an erase operation, and program (write) operation. These operations are performed in units, a page is the smallest unit in which data is read or written, and is usually 2 KB to 8 KB, while a block is the smallest unit of data which can be erased and is usually made up of several pages (e.g., 32-128 pages). Furthermore, as discussed in more detail below, the F-PUF flash package 100 may partially program one or more word lines of the NAND flash array 120, and, thereafter form a fingerprint based on the number of pulses (i.e. "the programming time") that was used to program the cells of these word lines.

However, due to the analog nature of PUF responses, the PUF responses are usually noisy. Therefore, it may be difficult to utilize the PUF responses directly as a cryptographic key.

Referring back to FIG. 1, in an attempt to solve the problem of noise, during the key generation phase, the flash package 100 may generate a key and corresponding helper data based on a PUF response. During the reproduction phase, the flash package 100 utilizes the helper data to reproduce the key from a subsequent PUF response. However, conventionally, this helper data may reveal information about the key, and, therefore, conventionally, the helper data may be "leaky".

In contrast, in one or more example embodiments, the flash package 100 generates non-leaky helper data, which reveals little to no information about the key.

Figure 3:
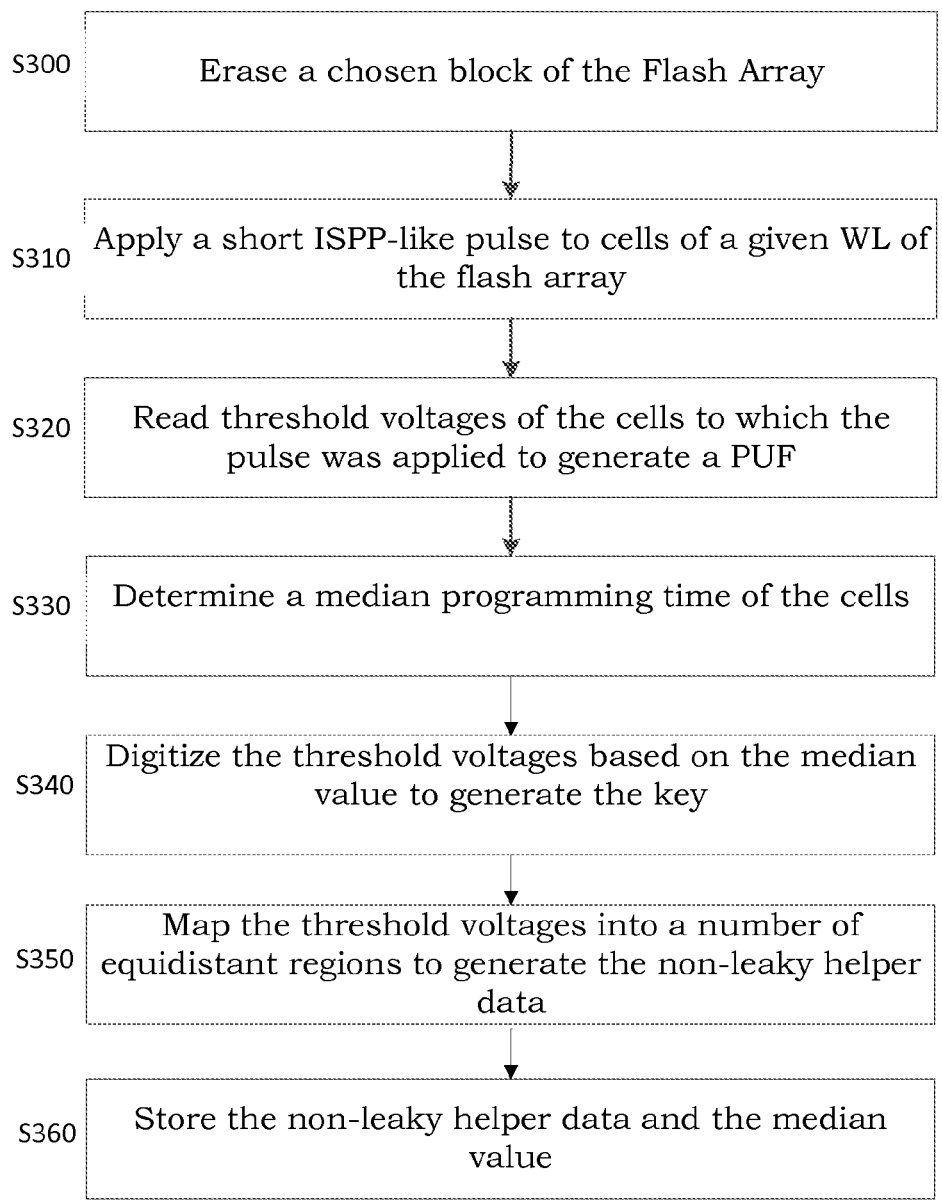
FIG. 3 illustrates a method of generating a cryptographic key from a flash based physical unclonable function F-PUF using non-leaky helper data to remove noise therein according to some example embodiments.

FIG. 3 illustrates a method of generating a cryptographic key from a flash based physical unclonable function F-PUF using non-leaky helper data to remove noise therein according to some example embodiments.

Referring to FIGS. 1 and 3, in operation S300, the controller 130 may erase a block of the NAND flash array 120.

In operation S310, the controller 130 may determine a number of short voltage pulses to utilize to program cells of the flash array and instruct the pulse generator 110 to supply the determined number of short voltage pulses to a word line WL of the NAND Flash array 120. The controller 130 may determine the number of short voltage pulses to supply such that a sufficient amount of cells of the WL of the NAND flash array 120 will flip in response thereto. The sufficient amount of cells may be an amount of cells sufficient to generate enough data to generate the key. For example, the controller 130 may be preprogrammed in advance with the number of pulses to generate based on experimental data. After each pulse the controller 130 may perform full or partial read to detect the state of the chosen cells of the particular WL.

The controller 130 may determine the number of short pulses such that at least 90% of the cells in a word line WL have been programmed. In other example embodiments, the controller 130 may determine the number of short pulses such that that majority of the cells in the word line WL have been programmed.

In other example embodiments, rather than prove a short ISPP-like pulse, the controller 130 may only program the WL with a single pulse, perform a read operation and utilize the distribution of the cells that were programmed by this single pulse as the data.

In operation S320, the controller 130 may read the WL of the flash array to determine which cells of the WL have passed the chosen threshold and record data indicating the number of pulses necessary to pass the chosen threshold for the each of the respective cells. In some example embodiments, to prevent excessive flash wearing, the controller 130 may perform a "partial read operation" after each pulse sent to the WL. The partial read operation may be an operation in which the controller 130 determines whether a cell is above or below a threshold without reading the actual value of the voltage stored in the cell. In other example embodiments, the controller 130 may perform a "full read operation" after each pulse. The full read operation may be an operation that includes a plurality of partial read operations.

For example, in some example embodiments the controller 130 may perform Algorithm 1 to partially program cells of the NAND Flash array 120.

---
Algorithm 1:
---

Choose a number of pulses Np, initial voltage V0, ISPP_step,
Number of the Block BlockNum, number of the Wordlines WL
and Voltage threshold Vt;
Ncells = number of cells in one WL;
Threshold[Ncells]; // array
PartialReadResult[Ncells]; // array
Erase_block(BlockNum);
for CellNum=1 to Ncells do {
    Threshold[CellNum]=−1;
}
For pulse_count = 1 to Np do {
    ISPP_program(BlockNum,WL,V0+pulse_count*ISPP_step);
    Partial_read(BlockNum,WL,Vt);
    for CellNum=1 to N_cells do {
        If    Threshold[CellNum]    =−1    and
PartialReadResult[CellNum] =1
            then Threshold[CellNum]=pulse_count // As the result,
    threshold number of pulses for each cell in WL are accumulated
    here
    }
}

---

Although not illustrated in FIG. 3, based on the read operation, the controller 130 may determine whether a desired number of cells have been programmed. For example, the controller 130 may determine whether there is enough data collected to generate the F-PUF. If the controller 130 determines that enough data has not been collected, the controller 130 may iteratively perform operations S300 to S320 with an increased number of voltage pulses until the desired number of the cells have changed their states at some voltage threshold.

In operation S330, the controller 130 may determine the median programming time of the cells in the WL.

In operation S340, the controller 130 may digitize the determined programming time of the given cells to generate the cryptographic key.

For example, the controller 130 may assign either a zero "0" value or a one "1" value to bits of the key based on whether corresponding cells changed their states after a medium number of pulses. For example, the controller 130 may determine that cells that failed to change their states after the median number of pulses are assigned a zero "0" value of the bit of the key, while cells that changed their states within the median number of pulses, are assigned a one "1" value of the bit of the key.

However, example embodiments are not limited thereto. For example, the controller 130 may determine that cells that were slow and failed to change their state within the median number of pulses are assigned a "1" value and cells that were quick and changed their states within the median number of pulses are assigned a "0" value. Further, if in operation S310, the controller 130 only utilized a single pulse, than in operation S340, the controller 130 may digitize the data without comparison to a median value. For example, the controller 130 may assign a zero "0" value of the key to the cells that failed to change their states in response to the single pulse, and assign a one "1" value of the key to cells that changed their states by this single pulse.

In operation S350, the controller 130 may generate the helper data associated with the generated cryptographic key.

For example, in some example embodiments, the controller 130 may divide the threshold value into different subsets by splitting the Histogram of pulse threshold values into several regions, while each of these regions contains the same number of the cells. The subsets may be designed such that at least two subsets associated with different digital values have a same helper data assigned thereto. Therefore, the helper data may be non-leaky such that the helper data may not provide useful information to a hacker attempting to derive the secret key from the helper data without having physical access to the F-PUF flash package 100.

In operation S360, the controller 130 may store the generated helper data. For example, the controller 130 may store the helper data in the data register 140. However, example embodiments are not limited thereto. For example, in other example embodiments, the helper data 140 may be stored directly in the NAND flash array 120.

Figure 4:
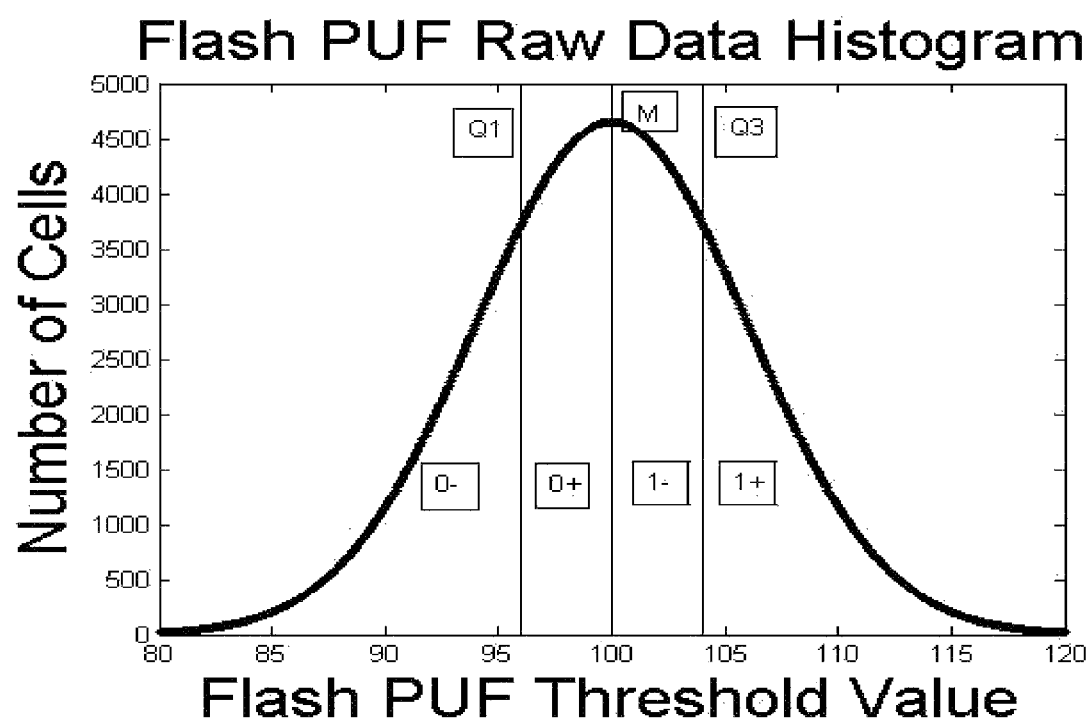
FIG. 4 illustrates an example of generating non-leaky helper data according to some example embodiments.

FIG. 4 illustrates an example of generating non-leaky helper data according to some example embodiments.

Referring to FIG. 4, the controller 130 may divide the histogram of PUF threshold values into an even number of subsets separated by quantiles. For example, as illustrated in FIG. 4, the controller 130 may normalize the distribution of the programming time and divide the normal distribution of PUF threshold values into four subsets "−0", "0+", "1−" and "1+" having three Quantiles "Q1", "M" and "Q3" therebetween, with the M Quantile being the median value of the programming time. For example, as illustrated in FIG. 4, if the distribution is normalized, the medium value may be "100". However, example embodiments are not limited thereto.

The controller 130 may assign a cell of the NAND Flash 120 to one of the subsets (for example, 0−, 0+, 1−, 1+ in FIG. 4) based on the programming time (e.g., the threshold value) associated with the cell.

As discussed below with regard to FIG. 5, during a subsequent generation phase, noise present during the analog reading of the voltage level of the cells may cause the controller 130 to incorrectly interpret that certain ones of the cells are programmed and, thus, lie on an opposite side of the median value M of the histogram, and, therefore, assign an incorrect digital value to those cells. However, by the use of the helper data, the controller 130 may be able to determine that the digital value assigned to some of the cells is incorrect. Further, because at least two of the four subsets having a same helper data assigned thereto are associated with different digital values, while an equal number of cells are assigned to each of the subsets, the helper data may be non-leaky such that the helper data may not provide useful information to a hacker attempting to derive the secret key from the helper data without having physical access to the F-PUF flash package 100.

Figure 5:
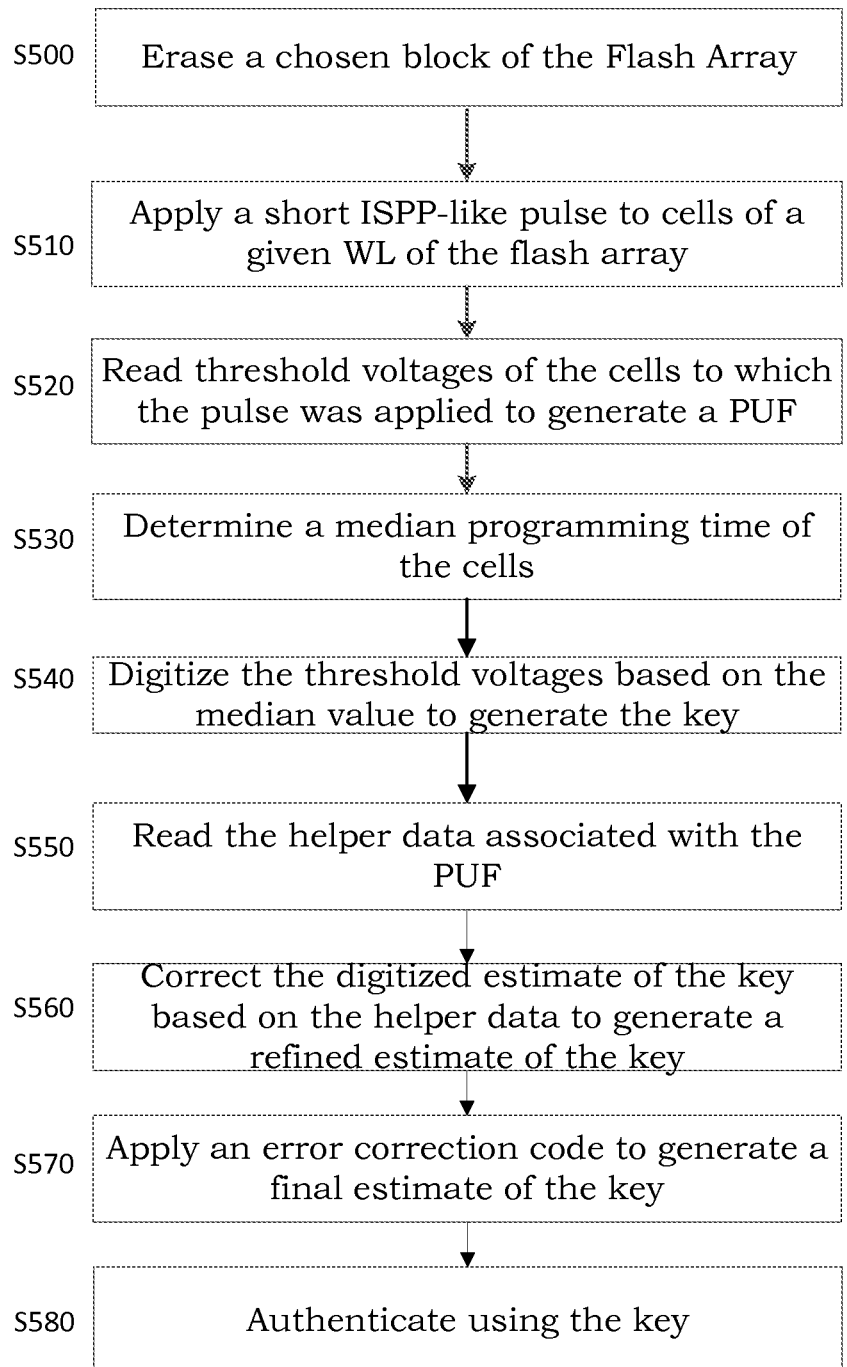
FIG. 5 illustrates a method of reproducing a cryptographic key from a flash based physical unclonable function F-PUF using non-leaky helper data to remove noise therein according to some example embodiments.

FIG. 5 illustrates a method of reproducing a cryptographic key from a flash based physical unclonable function F-PUF using non-leaky helper data to remove noise therein according to some example embodiments.

Referring to FIGS. 1 and 5, in operations S500 to S540, the controller 130 may measure the programming time of the cells of the flash memory 120 by applying pulses thereto to generate the F-PUF and digitize the PUF to generate an estimate of the key. Operations S500 and S540 may be the same as operations S300 to S340, and, therefore, repeated description thereof will be omitted herein for the sake of brevity. For example, in an attempt to generate the same F-PUF as was utilized to generate the secret key, the controller 130 may partially program the same cells of the flash memory array 120 with the same ISPP-like pulse during the reproduction phase as were programmed during the generation phase. However, in operation S530, the median value may be redetermined rather than using the same value determined during the generation phase in operation S330 due to the fact that the threshold value of the cells in the flash memory 120 may decrease over time as the cells wear.

In operation S550, the controller 130 may read the helper data associated with the F-PUF. For example, in some example embodiments the controller 130 may read the helper data from the data register 140. In other example embodiments, the controller 130 may read the helper data directly from the NAND flash array 120.

The noise contained in the analog measurements of the voltages measured in operation S520 may have caused the controller 130 to incorrectly digitize the measurement.

In operation S560, the controller 130 may correct the digital values generated in operation S540 with the aid of the helper data and produce a refined key estimate. This refined key estimate may contain a smaller number of errors in comparison than a rough estimate obtained in operation S550.

For example, as discussed above, during the Generation phase, the controller 130 may translate the measured number of pulses corresponding to the threshold value of cells to corresponding digital key bits by assigning digital values to the key bits based on whether the number of pulses is above or below a Median value (100 in FIG. 4).

Thereafter, the controller may determine helper data associated with each of the key bits. For example, as discussed above, with reference to FIG. 4, the controller may divide the histogram of the F-PUF threshold values into the several subsets each containing an approximately equal number of threshold values. The controller 130 may determine which subset the key bit is associated with based on the histogram.

For example, if the controller 130 determines that the threshold value of a bit is less or equal to Quantile1 (95.95 in FIG. 4), then the controller may assign a negative "−" helper bit to the key bit. If the controller 130 determines that the threshold value is more than Quantile1 and less than or equal to Median (100 in FIG. 4), the controller 130 may assign a positive "+" helper bit to the key bit. If the controller 130 determines that the threshold value is more than the Median, but less or equal to Quantile3 (104.05 in FIG. 4), the controller 130 may assign a negative "−" helper bit to the key bit, and, if the controller 130 determines that the threshold value is more than Quantile3 (104.05), the controller may assign a positive "+" helper bit to the key bit.

Thereafter, each of the positive and negative helper data are assigned to both a zero "0" digital value and a "1" digital value such that the helper data is non-leaky.

During the Extraction phase, the controller 130 may determine if a threshold reading is close to the Median (i.e., if the threshold reading is between the M−R to M+R interval, where R is, for example, half the distance between Quantile1 Q1 and the Median M.

If the controller 130 determines that the threshold reading is close to the Median (i.e., between the M−R to M+R interval), then the controller may determine that the value may either be "0+" or "1−". Therefore, the controller 130 may utilize the helper data to determine the correct value. For example, when the helper data is negative "−", the controller 130 may determine that the reading was "1−", and thus the key bit is "1". Similarly, if the helper data is positive "+", the controller 130 may determine that the key bit is "0".

If the controller 130 determines that the threshold reading is not close to the medium (i.e., outside M−R to M+R interval), the controller 130 may determine that the reading of the voltage alone is reliable, and, therefore, the controller 130 may ignore the helper bit. For example, the controller 130 may compare the reading of the threshold voltage with the median value (M), and if reading is less than M, the controller 130 may determine that the key bit is "0" and if the reading is greater than or equal to the threshold value, the controller 130 may determine that the key bit is "1".

In operation S570, the controller 130 may further correct the small number of errors in the refined key estimate using an error correction mechanism.

For example, in some instances, the controller 130 may be unable to accurately regenerate the code based on only the helper data. Therefore, in some example embodiments, in operation S570, the controller 130 may apply an error correction code (ECC) to the refined estimate the key to generate a final estimate of the key. In some example embodiments, the ECC may be a cyclic error-correcting code that is constructed using finite fields. For example, the controller may apply a Bose-Chaudhuri-Hocquenghem (BCH) code to get the final key.

In operation S580, the controller 130 may authenticate an electronic device containing the F-PUF flash package 100 using the final key. Therefore, the F-PUF flash package 100 may distinguish a genuine electronic device produced by an associated manufacturer and/or a trusted node of a network, and thus combat counterfeit electronic devices without the use of any special hardware changes to the flash memory contained therein.

FIG. 6 illustrates an example of generating and reproducing a cryptographic key from a flash based physical unclonable function F-PUF without utilizing non-leaky helper data according to some example embodiments.

Referring to FIGS. 1, 3, 5 and 6, during a generation phase, the controller 130 may generate a key by programming cells of the flash memory array 120 by applying a plurality of low voltage pulses thereto and digitizing the programming time. For example, the controller 130 may determine that the key is "01010110 10010000 00011000 01001000 01101010 00011010 10001000 00001101".

Subsequently, during a reproduction phase, the controller 130 may attempt to reproduce the key by again applying a plurality of low voltage pulses to cells of the flash memory array 130 and digitizing the subsequent programming time. However, the PUFs used to generate the original and reproduced key may have had noise associated therewith due to the analog measurements of the voltage. For example, the reproduced key may be "01010111 11010000 00011100 00001000 01101110 00001010 10001000 00001101". Therefore, as illustrated by the underlined values of the reproduced key in FIG. 6, there may be mismatches between the originally generated key and the reproduced key. Such mismatches may result in the inability to properly authenticate the device.

Figure 7:
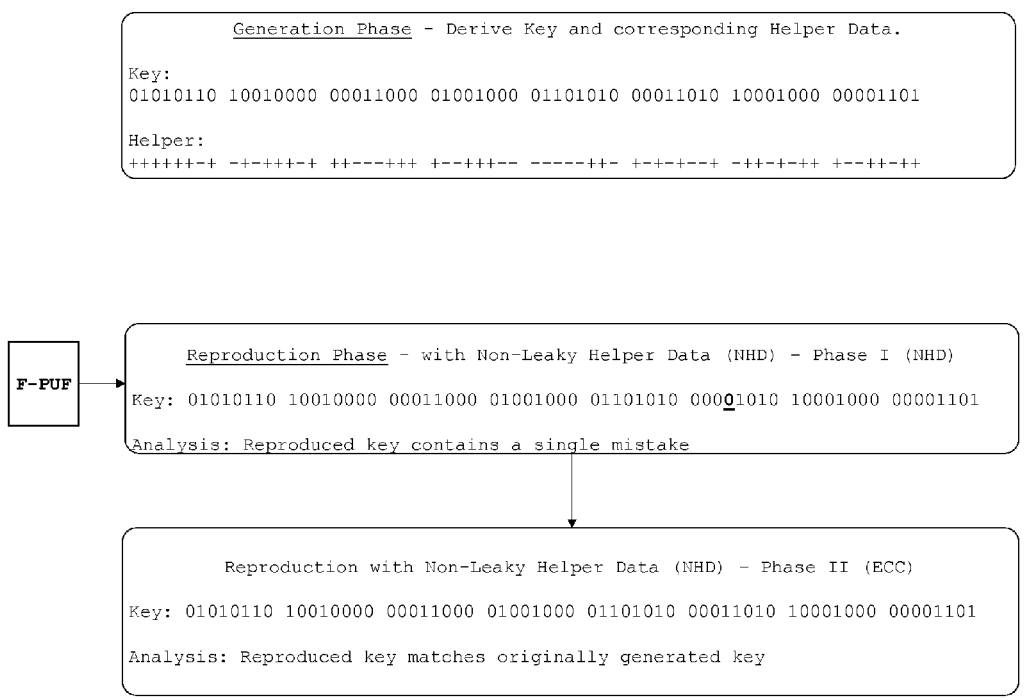
FIG. 7 illustrates an example of generating and reproducing a cryptographic key from a flash based physical unclonable function F-PUF utilizing non-leaky helper data to remove noise therein according to some example embodiments.

FIG. 7 illustrates an example of generating and reproducing a cryptographic key from a flash based physical unclonable function F-PUF utilizing non-leaky helper data to remove noise therein according to some example embodiments.

Referring to FIGS. 1, 3 to 5 and 7, during a generation phase, in addition to generating the key, the controller 130 may also generate helper data that is associated with the key. For example, the controller 130 may quantize the distribution of the programming times of the cells in a WL, such that the programming time distribution for all cells in a given word line WL is split into into several regions such that each of the regions contains the same number of the cells, and map the programming time of the each given cell into one of the regions.

For example, as illustrated in FIG. 4, for cells having a programming time that is very low and falls within a first subset, which is below line "Q1", the controller 130 may assign a negative "−" value to the helper data associated with the cells. For each of the cells having a programming time that is lower than the median programming time M but within the second subset 0+, between Quantiles Q1 and M, the controller 130 may assign a positive "+" value to the helper data associated with the cells. For each of the cells having programming times that is greater than the median programming time M but within the third subset 1−, between line M and Quantile Q3, the controller 130 may assign a negative "−" value to the helper data associated with the cells. Additionally, for each of the cells having programming times that are relatively high and fall within the fourth subset 1+, which is greater than Quantile "Q3", the controller 130 may assign a positive "+" value to the helper data associated with the cells.

Subsequently, during a reproduction phase, the controller 130 may attempt to reproduce the key by digitizing a subsequent analog measurement of the programming time by again applying a plurality of low voltage pulses to cells of the flash memory array 130. However, as discussed above, the PUFs used to generate the original and reproduced key may have had noise associated therewith due to the analog measurements of the voltages to determine the programming time. However, in one or more example embodiments, the controller 130 may utilize the non-leaky helper data generated during the generation phase in an attempt to match the reproduced key with the originally generated key in the reproduction phase. Further, in some example embodiments, in addition to utilizing the non-leaky helper data in the reproduction phase, the controller 130 may also utilize an error correction code (ECC) to further refine the reproduced key.

For example, as illustrated in FIG. 7, in the Generation phase, the controller 130 may determine that the threshold value for the eighth bit is slightly less than Median M, and therefore, the controller 130 may assign a zero to the eighth bit.

As discussed above with reference to FIG. 6, in reproduction phase, due to noise in the reading of the threshold value, the controller 130 may determine that the eighth bit of the key is one "1" because the noise may cause the threshold value that was slightly less than the Median to incorrectly be read as slightly larger than Median M).

However, because the helper data associated therewith that was determined in the Generation phase is positive "+", the threshold value may only belong to the second subset 0+ between Quantiles Q1 and M, or, the fourth subset 1+ higher Quantile Q3. However, since the threshold value of the eighth bit is near the median M, the controller 130 may determine that the threshold belongs to the second subset 0+, which is located between Quantiles Q1 and M, and, therefore, that is eighth bit of the key is zero "0" with positive "+" helper data.

Therefore, using the helper data, the controller 130 may be able to correct a significant amount of errors present in the reproduced estimate of the key.

However, as discussed above, some errors may still be present even after the helper data is used to refine the estimate of the key. Therefore, after correcting the estimate of the key using the helper data, the controller 130 may apply an error correction code (ECC) to the refined estimate of the key.

For example, the controller 130 may apply a BCH code to the refined estimate of the key to generate a final estimate of the key.

Figure 8:
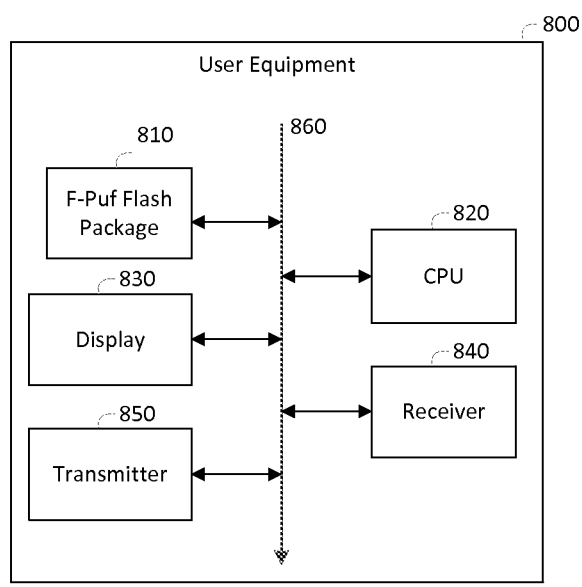
FIG. 8 illustrates user equipment containing an F-PUF flash package according to some example embodiments.

FIG. 8 illustrates user equipment containing an F-PUF flash package according to some example embodiments.

As illustrated in FIG. 8, user equipment 800 may include an F-PUF flash package 810, Central Processing Unit (CPU) 820, a display 830, a receiver 840, a transmitter 850 and a data bus 860 that handles communication therebetween.

The F-PUF flash package 810 may authenticate the user equipment 800 by generating a key and corresponding helper data during a generation phase and reproducing the key using the helper data during a reproduction phase. Therefore, the F-PUF flash package 810 may allow the user equipment 800 to distinguish a genuine part produced by an associated manufacturer and/or a trusted node of a network, and thus combat counterfeit electronic devices without the use of any special hardware changes to the flash memory contained therein.

The display 830 may display information to a user under the control of the CPU 820.

The receiver 840 and transmitter 850 may receive and transmit signals, respectively under the control of the CPU 820. The receiver 840 and transmitter 850 may include hardware and any software for transmitting and receiving wireless signals, respectively, including, for example, data signals, control signals, and signal strength/quality information via one or more wireless connections to other network elements.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

We claim:

1. A method of generating a cryptographic key and corresponding helper data, the method comprising:
    measuring an analog value associated with a physical property of cells of a memory array;
    digitizing the measured analog value to generate the cryptographic key;
    quantizing the measured analog value to generate the corresponding helper data by assigning the measured analog values to one of a plurality of quantiles based on a value thereof, the helper data having at least two different values, and the plurality of quantiles being associated with the helper data such that at least two of the plurality of quantiles that are associated with different digitized values of the measured analog value are associated with a same one of the at least two different values of the helper data; and
    storing the helper data in a data register.

2. The method of claim 1, wherein the helper data does not reveal information on the cryptographic key.

3. The method of claim 1, wherein the measuring an analog value comprises:
    applying a plurality of voltage pulses to a cell of the plurality of cells of the memory array; and
    determining which one of the plurality of applied voltage pulses turns the cell on.

4. The method of claim 3, wherein the applying a plurality of voltage pulses includes applying an incremental step pulse to the cell.

5. The method of claim 1, wherein the memory array is a NAND flash memory array.

6. The method of claim 1, wherein the physical property is respective threshold voltages of the cells of the memory array.

7. A method of reproducing a cryptographic key, the method comprising:
measuring an analog value associated with a physical property of cells of a memory array;
digitizing the measured analog value to generate an estimate of the cryptographic key; and
correcting the estimate of the cryptographic key using helper data associated with the cryptographic key to reproduce the cryptographic key, the helper data having at least two different values, and the correcting including determining which of a plurality of quantiles the measured analog value is associated with based on the helper data, each the plurality of quantiles being associated with the helper data such that at least two of the plurality of quantiles that are associated with different digitized values of the measured analog value are associated with a same one of the at least two different values of the helper data.

8. The method of claim 7, wherein the helper data does not reveal information on the cryptographic key.

9. The method of claim 7, wherein the correcting the estimate of the cryptographic key comprises:
determining if values of bits of the cryptographic key are associated with an incorrect subset based on the helper data; and
inverting the value of bits of the cryptographic key, if the determining determines that the values are associated with an incorrect subset to generate a refined estimate of the cryptographic key.

10. The method of claim 7, further comprising:
applying an error correction code to the refined estimate of the cryptographic key to reproduce the cryptographic key.

11. The method of claim 7, wherein the physical property is respective threshold voltages of the cells of the memory array.

12. The method of claim 7, wherein the method further comprises:
authenticating a device containing the memory array using the cryptographic key.

13. A device configured to authenticate using a cryptographic key, the device comprising:
a memory array; and
a controller configured to,
measure an analog value associated with a physical property of cells of the memory array,
digitize the measured analog value to generate the cryptographic key,
quantize the measured analog value to generate the corresponding helper data by assigning the measured analog values to one of a plurality of quantiles based on a value thereof, the helper data having at least two different values, and the plurality of quantiles being associated with the helper data such that at least two of the plurality of quantiles that are associated with different digitized values of the measured analog value are associated with a same one of the at least two different values of the helper data, and
store the helper data in a data register.

14. The device of claim 13, further comprising:
a pulse generator configured to apply a plurality of voltage pulses to a cell of the plurality of cells of the memory array, and wherein
the controller is configured to measure the analog value by determining which one of the plurality of applied voltage pulses turn the cell on.

15. The device of claim 13, wherein the controller is further configured to,
remeasure an analog value associated with the physical property of the cells of the memory array,
digitize the remeasured analog value to generate an estimate of the cryptographic key, and
correct the estimate of the cryptographic key using the helper data associated with the cryptographic key to reproduce the cryptographic key.

16. The device of claim 13, wherein
the physical property is respective threshold voltages of the cells of the memory array, and
the controller is configured to authenticate the device using the cryptographic key.

17. The device of claim 13, wherein the memory array is a NAND flash memory array.

18. The device of claim 15, wherein the helper data does not reveal information on the cryptographic key.

19. The device of claim 15, wherein the controller is configured to correct the estimate of the cryptographic key by,
determining if values of bits of the cryptographic key are associated with an incorrect subset based on the helper data, and
inverting the value of bits of the cryptographic key, if the controller determines that the values are associated with an incorrect subset to generate a refined estimate of the cryptographic key.

20. The device of claim 19, wherein the controller is configured to reproduce the cryptographic key by applying an error correction code to the refined estimate of the cryptographic key.

* * * * *